United States Patent [19]
Cote et al.

[11] Patent Number: 5,932,099
[45] Date of Patent: Aug. 3, 1999

[54] INSTALLATION FOR BIOLOGICAL WATER TREATMENT FOR THE PRODUCTION OF DRINKABLE WATER

[75] Inventors: Pierre Cote, Andresy; Jacques Sibony, Paris; Annie Tazi-Pain, Asnieres; Michel Faivre, Achéres, all of France

[73] Assignee: Omnium de Traitements et de Valorisation (OTV), Cedex, France

[21] Appl. No.: 08/823,533

[22] Filed: Mar. 24, 1997

Related U.S. Application Data

[63] Continuation of application No. PCT/FR96/01180, Jul. 25, 1996.

[30] Foreign Application Priority Data

Jul. 25, 1995 [FR] France ................................. 96 09336

[51] Int. Cl.$^6$ .................................................. C02F 3/06
[52] U.S. Cl. .......................... 210/605; 210/614; 210/617; 210/631; 210/96.1; 210/151
[58] Field of Search ...................... 210/605, 614, 210/616–618, 620, 630, 631, 638, 639, 96.1, 150, 151

[56] References Cited

U.S. PATENT DOCUMENTS

| | | | |
|---|---|---|---|
| 4,566,971 | 1/1986 | Reimann et al. | 210/616 |
| 4,956,093 | 9/1990 | Massoud et al. | 210/616 |
| 5,230,803 | 7/1993 | Thuer et al. | 210/615 |
| 5,364,534 | 11/1994 | Anselme et al. | 210/650 |
| 5,385,664 | 1/1995 | Oinuma et al. | 210/151 |
| 5,618,430 | 4/1997 | Fuchs | 210/617 |
| 5,620,891 | 4/1997 | Drummond et al. | 210/61 |
| 5,653,883 | 8/1997 | Newman et al. | 210/617 |

FOREIGN PATENT DOCUMENTS

| | | |
|---|---|---|
| 0659694 | 6/1995 | European Pat. Off. . |
| 2 628 337 | 2/1992 | France . |
| 2 696 440 | 4/1994 | France . |
| 61-274799 | 4/1986 | Japan . |
| 61-249592 | 6/1986 | Japan . |
| 62-221493 | 9/1987 | Japan . |
| 63-200895 | 8/1988 | Japan . |
| 04087694 | 3/1992 | Japan . |
| 04104895 | 7/1992 | Japan . |

*Primary Examiner*—Thomas G. Wyse
*Attorney, Agent, or Firm*—Merchant, Gould, Smith, Edell, Welter and Schmidt

[57] ABSTRACT

This invention relates to a plant for the biological treatment of water to produce drinking water, characterized in that it comprises at least one biological reactor (7) provided with injection means (9) for injecting oxygenated gas, at least one separation membrane (11 for microfiltration or ultrafiltration immersed in said reactor (7), and addition means (10) for adding to said reactor (7) at least one pulverulent material in suspension serving as a support for a biomass, said pulverulent material possibly being a reactive powder which also allows fixation of the substrate required by said biomass.

17 Claims, 2 Drawing Sheets

INSTALLATION FOR BIOLOGICAL WATER TREATMENT FOR THE PRODUCTION OF DRINKABLE WATER

This is a continuation of PCT/FR96/01180 application filed Jul. 25, 1996.

This invention relates to the area of filtration and purifying plants for water treatment.

The invention applies more precisely to the treatment of drinking water such as in particular underground water, either deep or karstic, or surface water.

Conventionally, plants for the treatment of drinking water generally comprise a succession of physicochemical treatment units such as flocculation/sedimentation/filtration completed by an oxidation unit.

Flocculation is a physicochemical stage whose purpose is to modify the condition of the colloidal particles contained in water by adding a coagulant (aluminium polychloride, aluminium sulfate, ferric chloride, etc.) so that they may be eliminated by sedimentation.

The micro-organisms, micro-pollutants, compounds (ferrous iron, manganese, etc.) which cannot be removed by flocculation are generally oxidised through the use of strong oxidants such as ozone, chlorine, or chlorine bioxide.

The elimination of micro-pollutants may also be made by adsorption on activated carbon or by stripping (forced aeration) if they are volatile.

The filtration stage intended to remove the particles in suspension is conventionally conducted on one or more beds of pulverulent non-reactive materials such as sand filters.

A conventional plant for the treatment of drinking water may therefore comprise a flocculation unit, followed by a sedimentation unit, a filtration unit (for example on sand) an ozonation unit, a filtration unit on powdered or granular activated carbon and disinfection.

Such conventional installations for the treatment of drinking water in the present state of the art have numerous disadvantages.

Firstly, since they are made up of a multiplicity of units each reserved for specific treatment, they are of substantial size which may hinder their set-up. This problem is especially heightened when drinking water treatment plants are to be set up in urban areas, that is to say where available surface area is rare and often costly.

Moreover, such plants require the assembly of numerous connections between the different treatment units, connections which take time to install, are costly and represent an equivalent number of points of weakness within the plant.

As an alternative to conventional drinking water treatment systems, a method of membrane filtration has in particular been recently suggested which uses a circulation loop for the water to be treated including at least one tangential filtration membrane with the injection of ozone into the circulation loop.

Known drinking water plants which use membranes have the disadvantage of being costly to set up, in particular as they cannot be adapted to existing, conventional installations without considerable conversion work.

The biological treatments conventionally used to treat residual waters have been relatively little used for drinking water plants, since they imply the use of bacteria which are difficult to restrict solely to those stages for which they are required, and which may therefore pollute the water to be made safe for drinking at subsequent stages of treatment. Also, such treatments must be set in operation at temperatures which allow the micro-organisms used to degrade the carbon and/or nitrogenous pollution contained in the water.

However, it is more desirable to have available drinking water treatment systems which may be set in operation at low temperatures especially during the Winter months.

In particular it will be noted that consideration has never been given, to the knowledge of the applicant, to the possibility of growing activated sludge in drinking water that is to be treated. It is true that using said activated sludge with conventional clarification means would lead to a loss in biomass through release into the clarified water that would exceed production, thereby preventing sufficient sludge age to be reached.

The objective of the present invention is to present a plant for the treatment of drinking water which does not have the disadvantages of state of the art plants.

Another objective of the present invention is to propose a plant for the treatment of drinking water which uses a biological treatment stage.

A further objective of the present invention is to propose said plant which may be set up at low cost by renovating existing drinking water plants which use conventional filters such as sand filters.

A further objective of this invention is to describe said plant which combines the advantages of biological treatment with those of treatments using compounds allowing the adsorption of micro-pollutants or nitrogenous pollution such as powdered activated carbon, clays, zeolites, etc.

A further objective of this invention is also to include in a water treatment plant one or more filtration membranes while nevertheless maintaining high treatment flow rates.

A further objective of the present invention is also to propose a drinking water treatment plant having high flexibility of use which may be used at temperatures at which there is little or no biological activity.

These various objectives and others which shall become apparent below are reached with this invention which relates to an installation for the biological treatment of drinking water characterized in that it comprises at least one biological reactor provided with means of injecting an oxygenated gas, at least one microfiltration or ultrafiltration membrane immersed in said reactor, and means within said reactor for adding at least one pulverulent material in suspension serving as a support for a biomass, said pulverulent material being possibly made up of a reactive powder which also allows fixation of the substrate required by said biomass.

The invention is therefore original in that it proposes treating drinking water using an activated sludge whereas the state of the art extensively dissuaded those skilled in the art from using a free biomass for such process. According to the invention, the use of an activated sludge is made possible through the use of at least one microfiltration or ultrafiltration membrane which holds back the biomass within the reactor and therefore prevents it from migrating outside the latter. With the use of said membrane it is also possible to obtain a sufficiently long sludge age to permit water purification.

The invention is also original in that it proposes the adding of at least one pulverulent material to the reactor during drinking water treatment. Said material (contributes towards development of the biomass by serving as a support for the latter. Again according to the invention, the pulverulent material used may constitute a reactive powder contributing directly towards water treatment by adsorbing on its surface the substrates (organic matter, $NH_4$) required by the biomass. These reactive powders may be chosen in relation to the composition of the drinking water to be treated, in particular in relation to its organic matter and $NH_4$ content. Powdered activated carbon (PAC) may be used to permit advanced adsorption of organic matter and slight adsorption of $NH_4$, whereas zeolites will be preferably used to permit advanced adsorption of $NH_4$ and slight adsorption of organic matter.

The plant of the invention therefore advantageously allows the association within one and the same reactor of the combined advantages of biological treatment and membrane filtration. The fixed biomass allows breakdown of biodegradable carbon pollution (CODB) and nitrogenous pollution, and the membranes permit both water filtration and elimination of matter in suspension therein while effectively preventing migration of the biomass. Also, said plant allows the use of reactive powders which may be added as required to the drinking water to be treated, particularly in relation to the composition of said water.

The means used to add a pulverulent material to the reactor may therefore be used to add to the water present in the reactor any non-reactive pulverulent material serving as a support for the biomass used, such as for example sand or anthracite, and also to add to said water one or more reactive powders of various types. It will be noted that for the present description the terms "reactive powders" shall be understood to mean any powder likely to react with one of the compounds in the drinking water to be treated, either by adsorption or by ion exchange, with a view to removing the content of these compounds in said water to be treated. These powders must also have physical characteristics of hardness, abrasiveness and density, allowing their fluidization in the water present in the reactor and making them compatible with the membranes used.

These reactive powders may advantageously, using the plant of the invention, be added to the water to be treated in relation to the composition of said water, in particular in relation to its micropollutant content and especially its pesticide content (atrazine, simazine etc.) which are compounds that are difficult to remove by biological means. These reactive powders may also be used to rid the water of toxic metals it may contain such as cadmium or lead.

In certain cases, as shall be explained below in detail, these reactive powders may also be used to adsorb carbon or nitrogenous pollution when the biomass used in the reactor is little or not at all active, as the temperature of the water passing through the reactor is too low. Therefore, the use of these reactive powders will if necessary provide for the functional relay of the biomass thereby bestowing upon the plant of the invention great flexibility of use allowing it to be set in operation whatever the temperature of the water to be treated may be.

The presence of membranes in the reactor allows very effective filtration of the drinking water to be made treated and prevents any passage of bacteria to subsequent stages of the treatment process.

Finally, the means of injecting oxygenated gas into the plant has four main objectives. Firstly, it allows the supply of necessary oxygen for respiration of the biomass in the reactor. Secondly, it ensures fluidization of the powders also present in the reactor. Thirdly, it ensures thorough mixing of said powders with the water and finally it subjects the membranes immersed in the reactor to shaking which prevents or at least delays their fouling.

Said characteristic is of particular interest since it allows the conversion of out-of-date drinking water plants into new plants leading to improved production without having recourse to new civil engineering works. It is therefore possible to reduce considerably the costs generally incurred when setting up new equipment.

Preferably, said reactive powder is chosen from the group made up of powdered activated carbon (PAC), zeolites, clays, and exchange resins. Powdered activated carbon (PAC) may preferably be used as compound to adsorb micro-pollutants in particular pesticides. PAC may therefore be added in particular during periods in the year when the water content of these compounds is especially high, particularly in Spring. Zeolites, clays and exchange resins may be used to entrap nitrogenous pollution in the event of insufficient biomass activity due to a drop in temperature or they be used to trap metals.

It will be noted that in the present state of the art a plant for drinking water treatment using non-biological means is already known, which uses both tangential filtration membranes and the addition of powdered activated carbon. Said plant is described in French patent application N° 2629337. However, within said plant, the injection of pulverulent material is made at a recycling loop so that this powder can be collected as soon as its adsorbent properties are exhausted. Unlike said plant, the plant of the invention does not require any recycling loop which simplifies in particular its installation. Also, the invention distinguishes itself from the technique described in this document inasmuch as the reactive powders are not simply used for their adsorbent properties but also to serve as a support for bacteria fixation thereby opening up the possibility of combining biological treatment and membrane filtration.

Another French patent application N° 2696440 also describes a non-biological drinking water treatment plant using separate units for sedimentation of the mixture with a pulverulent reagent and for tangential filtration on membranes. In this plant of the prior art, the pulverulent reagent is also directed towards the sedimentation unit via a recyling loop and is constantly renewed as soon as its adsorbent properties are exhausted.

The invention therefore sets itself apart from the technologies described in these two documents through the characteristics according to which it proposes addling several reactive powders directly to the reactor in which the membranes are present, and in that it proposes using these powders also to serve as a support for a biomass.

According to another preferential aspect of the invention that is of interest, said plant also comprises at least one anoxic pre-denitrification unit upstream from said biological reactor. The use of a denitrification basin in conjunction with a nitrification basin is well known in the area of residual water treatment. However, up until now such use was not possible for the treatment of drinking water given the risk of bacteria being carried towards subsequent treatment stages. Such pre-denitrification is made possible with the plant of the invention inasmuch as such risk is avoided through the presence of hollow fibre filtration membranes whose pore size is designed to prevent the passage of any microorganism in the filtrates.

Also, it will be noted that in plants for the treatment of residual waters, the sludge from the nitrification basin is sent to the front of the plant to be treated in the denitrification basin. Such sending offline is not necessary for the treatment of drinking water since the nitrates are present in raw water and very few nitrates are formed in the downstream stage of nitrification.

Preferably, the plant comprises means of pre-treatment provided upstream of said biological reactor and includes clarification means. This pre-treatment means may also include a flocculation/coagulation unit upstream of said means of clarification. Such means of pre-treatment may also be provided using the pre-treatment means of a conventional plant on a renovated sand filter.

Also preferably, said biological reactor has in its lower and upper parts sludge drainage means. The sludge collected with these drainage means may be redirected towards means for sludge treatment.

According to a preferable aspect of the invention of particular interest, the civil engineering works for said plant entails the conversion of existing civil engineering works of a drinking water treatment plant with physical filtering on granular material, said biological reactor consisting of a granular material filtration basin of said drinking water treatment plant.

It will be noted in this respect that the use of denitrification means upstream does not prevent such renovation of an existing plant, the size of the sand filters being such that they may be divided up to form both a pre-denitrification basin and a biological reactor for nitrification and filtration on hollow fibre membranes.

Also preferably, the plant comprises means of measuring the concentrations of pollutants in the water to be treated, to which is connected said means of adding at least one pulverulent material.

The invention also relates to a biological treatment process for drinking water, characterised in that it consists of passing the water through a plant as described above and using said means of addition of said plant to allow the addition to said reactor of at least one pulverulent material serving as a support for the biomass and/or the addition, at least intermittent, to said reactor of at least one reactive powder, said reactive powder being added in relation to the pollutants present in the raw water and/or to the temperature of the drinking water to be treated.

The process of the invention therefore also offers the original characteristic of reinforcing the biological support role played by the pulverulent material, when the conditions of drinking water treatment so require, by the addition of at least one reactive powder. Said reinforcement may in particular prove to be necessary when the treatment temperature is too low to allow biological activity of the biomass or when there is an increase in the load of water to be treated.

According to a variant of the invention, the process of the invention is used when the temperature of the water to be treated allows normal biological activity of said biomass permitting the biological degradation of CODB and nitrogenous pollution in said water, and consists of using said means of addition of a pulverulent material to distribute at least one reactive powder in said reactor in relation to at least one parameter chosen from the group made up of pesticide content, CODB content and heavy metal content of the water.

In practice, the temperature at which the metabolism of the bacteria is inhibited is in the region of 4–5° C. During the periods when the temperature of the drinking water to be treated is above this temperature, the plant of the invention may therefore be used to add at least periodically with the means provided for this purpose one or more reactive powders intended to break down the non-biodegradable carbon pollution, the pesticides and metals contained in the drinking water to be treated. The fixed bacteria take in charge the elimination of biodegradable carbon pollution and the removal of nitrogenous pollution.

In this case, and as already specified above, the pulverulent material used is preferably powdered activated carbon active to remove pesticides, and zeolites to adsorb the heavy metals present.

According to one interesting variant of said process, the reactive powders whose adsorbent properties are exhausted may be maintained in said biological reactor, when they form a non-reactive pulverulent material serving as a fixation support for the biomass.

According to a further aspect of the process of the invention, said means of adding pulverulent material is used when the temperature of the drinking water to be treated inhibits the activity of said biomass so that it distributes within the reactor at least a first reactive powder intended to adsorb organic compounds, and at least a second reactive powder intended to adsorb ammonia pollution. Therefore, when the temperature of the water to be treated is less than 4–5° C., the reactive powders are added to entrap the undesirable compounds present in the water to be treated and therefore to substitute for the action of the bacteria.

In this case, said first powder is preferably powdered activated carbon, and said second powder is preferably chosen from the group made up of zeolites and clays.

Advantageously, the process then comprises a stage consisting of renewing the first and second powders when the adsorbent properties of the latter come to be exhausted.

The invention, and the different advantages it offers will be more easily understood with the help of the description given below which follows a non-restrictive embodiment of the invention, and refers to the drawings in which.

Figure 1:
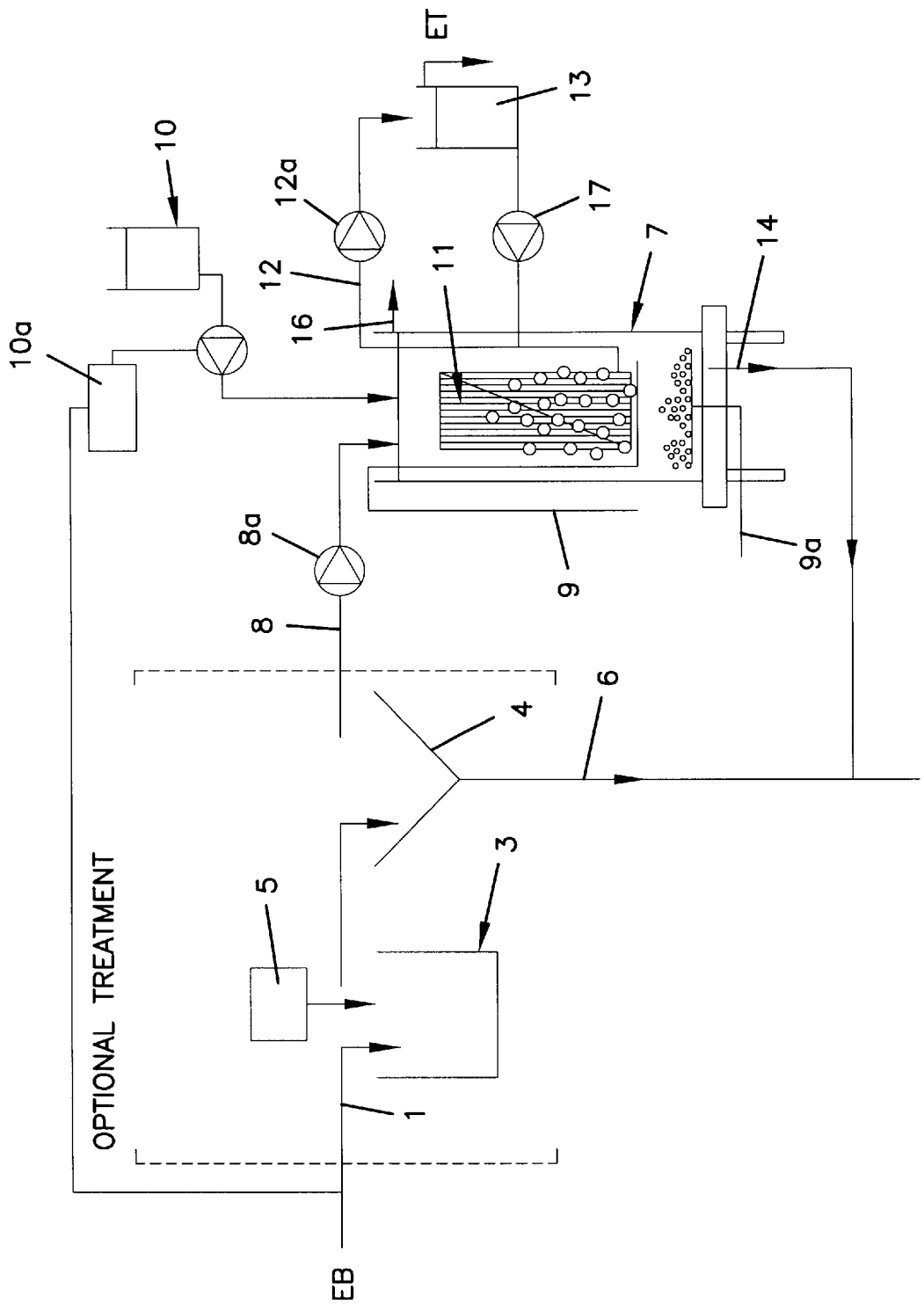
FIG. 1 represents a diagram of the plant of the present invention.

With reference to FIG. 1, the raw water (RW) to be treated arrives in the plant represented via pipe 1.

The water is then directed towards means of pre-treatment consisting of a coagulation/flocculation unit 3 and a clarifier 4. It will be noted that this means of pre-treatment is optional. Therefore, it may be envisaged to direct the water directly into the means of biological treatment described below, without making it pass through said means of pre-treatment when the water contains little or no pollutants likely to be coagulated. It may also be contemplated, in other embodiments, not to provide for said means of pre-treatment within the plant.

The coagulation/flocculation unit 3 comprises distribution means 5 of a coagulant reagent (aluminium polychloride, aluminium sulfate, ferric chloride, etc.) allowing the colloidal matter in suspension in the water to coagulate. The mixture of water and coagulated matter is then directed towards clarifier 4 where it undergoes sedimentation. The sludge derived from this sedimentation is extracted at 6.

The water drawn off the top of clarifier 4 is then directed towards biological reactor 7 with a holding capacity of 200 liters by pipe 8 aided by pump 8a controlled by the water level in reactor 7.

An ultrafiltration module 11 consisting of outer pressure hollow fibres (filtration from outside to inside the membrane) representing a filtering surface of 12 m$^2$ is immersed in reactor 7. The compactness and flux of these immersed membranes 11 allow treatment rates to be obtained that are comparable to existing sand filters, that is to say in the region of 6 to 8 m$^3$/m$^2$/h. The permeate exiting this module is evacuated by pipe 12 after aspiration pumping by pump 12a. The treated water (TW) is collected at the exit of pipe 12 and passes into tank 13 before leaving the plant.

In accordance with the invention, means of adding pulverulent materials 10, consisting of a bubble mixer, can be used to add to the water transiting through reactor 7 both non-reactive powders, such as sand or anthracite serving as a fixation support for a biomass, and reactive powders in continuous or intermittent manner. These reactive powders are preferably made up of powdered activated carbon (PAC), zeolites, clays or ion exchange resins and are added to the water to be treated in relation to the load of water to be treated and to the temperature thereof.

For this purpose, a means of measurement 10a is provided to measure concentrations of pollutants in the water to be treated, said addition means 10 for adding pulverulent materials being connected to said measurement means 10a.

Also in accordance with the invention reactor 7 is fitted with means for injecting an oxygenating gas, in this instance air, consisting of two injection ramps 9,9a provided in the lower part of the reactor. Said aeration means allows a perfectly mixed reactor to be obtained.

With said aeration means 9 it is possible to maintain in suspension the powders present in reactor, to mix the water with these powders, to provide bacteria with necessary oxygen and to shake the immersed membranes to prevent fouling.

Defouling of membranes is therefore permanently ensured by the injection of air along the fibres, and cyclically by an injection of treated water sent from tank 13 in counter-current direction (from inside to outside the fibre) with the help of reflux pump 17.

Reactor 7 is also fitted with sludge drainage means 14 in its lower part to remove down-drainage through pipe 15; top-drainage of reactor 7 is evacuated through pipe 16. Top-drainage is essentially made up of fines of pulverulent materials and down-drainage of sedimenting matter. Said drainage allows uniform powder granulometry in reactor 7.

Down-drainage allows management of sludge age in the reactor according to the following formula:

Sludge age=reactor volume/daily drainage volume

Also hydraulic residence time (HRT) of the water to be treated in the reactor is given by the following formula:

HRT=reactor volume/flow-rate of treated water

When said plant is set in operation, if the water arriving in reactor 7 does not contain any dissolved organic micropollution and if the temperature so permits, the system operates without the addition of adsorbent powder by bubble mixer 10, in which case the removal of ammonia is ensured by concentrated nitrifying bacteria in reactor 7.

Powdered activated carbon or another reactive adsorbent powder is injected into the reactor via bubble mixer 10 when the water to be treated requires the removal of dissolved organic pollution (from March to August for example).

During the Winter, if the water temperature is too cold, an addition of zeolite into the reactor allows the ammonia concentration of the treated water to meet drinking water standards.

Results

The plant shown in FIG. 1 was used to treat surface water with a net flow-rate of 10 m$^3$/day.

Table I gives the physicochemical and bacteriological quality of the water to be treated (RW) and of the treated water (TW) by the plant described above.

As can be seen in Table I below, the plant allows the full or almost full removal of compounds in particle form. Average removal efficacy is 85% for turbidity, 100% for iron, 80% for aluminium and 100% for germs indicating fecal contamination.

TABLE I physicochemical and bacteriological quality of the water to be treated and of water treated by the system

| Parameters | Units | | Mean | Min | Max | N° Measurements |
|---|---|---|---|---|---|---|
| Turbidity | NTU | RW | 1.75 | 1.1 | 2.6 | 35 |
| | | TW | 0.25 | 0.13 | 0.54 | 35 |
| Iron | mg/l | RW | 30 | <20 | 50 | 8 |
| | | TW | <20 | <20 | <20 | 8 |
| Aluminium | mg/l | RW | 305 | 195 | 345 | 8 |
| | | TW | 60 | 35 | 70 | 8 |
| Coliformis 37° C. | nb/100 ml | RW | 37600 | 5100 | 85000 | 6 |
| | | TW | 0 | 0 | 0 | 6 |
| Thermotolerant coliforms 44° C. | nb/100 ml | RW | 9500 | 1500 | 26000 | 6 |
| | | TW | 0 | 0 | 0 | 6 |
| Streptococci D | nb/100 ml | RW | 1225 | 84 | 3700 | 6 |
| | | TW | 0 | 0 | 0 | 6 |
| Anaerobic sulfate reducing bacteria spores | nb/100 ml | RW | 28 | 7 | 60 | 6 |
| | | TW | 0 | 0 | 0 | 6 |

Figure 2:
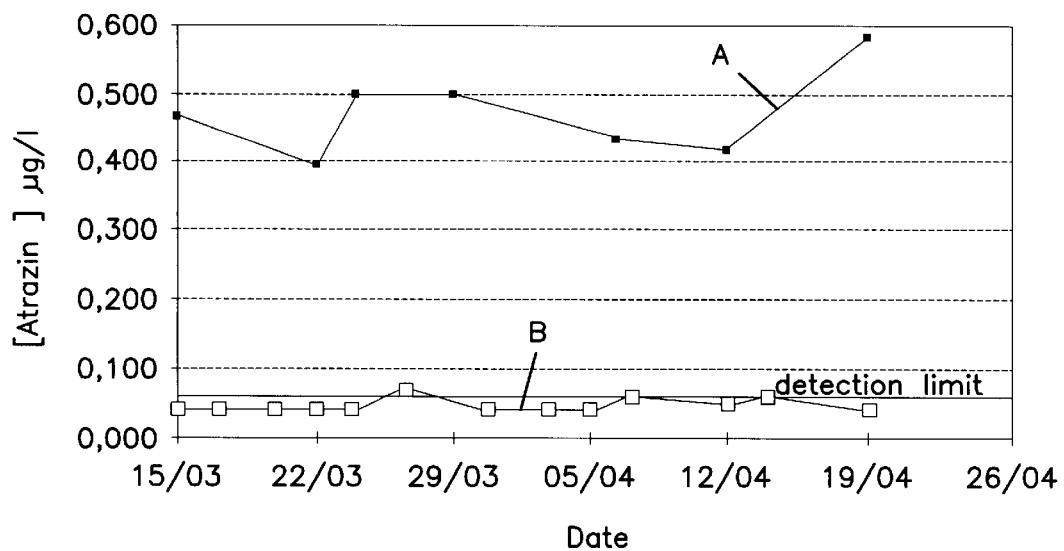
FIG. 2 represents the development in time of the atrazine concentrations of the water to be treated and of the water treated with the plant shown in FIG. 1.

As can be seen in FIG. 2, in which curve A shows the development in atrazine content of the water to be treated and in which curve B shows the development in atrazine concentration of treated water, the plant achieves full atrazine removal for concentrations of 0.400 to 0.600 mg/l in the water to be treated with a dose of 6.7 g/l powdered activated carbon in raw water, a hydraulic residence time of 25 minutes and a sludge age of 30 days. These conditions correspond to an equilibrium concentration of 10 g/l of powdered carbon in the bioreactor.

Figure 3:
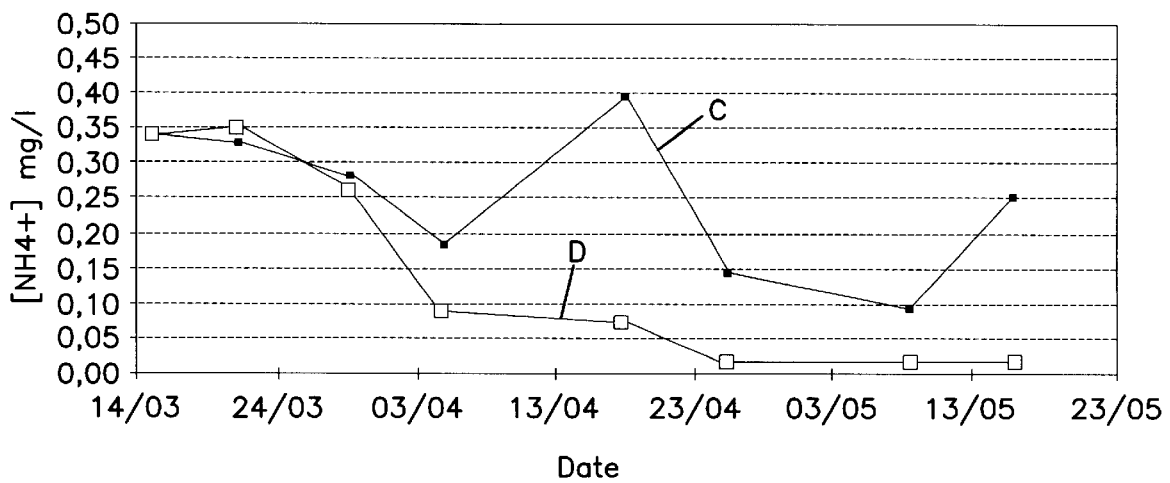
FIG. 3 represents the development in time of ammonia concentrations in the water to be treated and the water treated with the plant shown in FIG. 1.

As can be seen in FIG. 3, in which curve C shows the development in ammonia content of the water to be treated and in which curve D shows the development in ammonia concentration of treated water, the plant also makes possible the full removal of ammonia by nitrifying bacteria 40 days after setting in operation. Under the same operating conditions as those described in the paragraph above, and with water temperatures of 11° C., the system was gradually seeded itself with such nitrifying bacteria.

As can be seen in Table 3, in parallel manner the reactor "in biological operation" ensured the removal of biodegradable organic carbon to reach concentrations in the treated water of 0.2 to 0.3 mg/l.

Table 3 gives the efficacy of ammonia removal by a zeolite: clinoptilolite. A treatment rate of 30 ppm and a hydraulic residence time of 20 minutes allows 56% removal for concentrations in the water to be treated of 0.5 mg/l. This adsorption function allows the residence time of the ammonia in the reactor to be extended when biological nitrification kinetics are slow.

TABLE 2

Removal of CODB by the biological reactor

| Parameters | Unit | 1 | 2 |
|---|---|---|---|
| [CODB] Water to be treated | mg/l | 0.8 | 0.7 |
| [CODB] Treated water | mg/l | 0.2 | 0.3 |

TABLE 3

Ammonia adsorption yield by clinoptilolite.

| [N—NH4+] Water to be treated | mg/l | 0.5 |
|---|---|---|
| [N—NH4+] Treated water | mg/l | 0.22 |
| Adsorption yield | % | 56 |

Such plant therefore offers great flexibility of use since it makes possible the removal of a great number of pollutants of different natures and is operational whatever the temperature may be of the water to be treated.

Also, the above-described plant has the advantage of bring possibly set up on the basis of an existing drinking water treatment plant using a sand filter. Reactor 7 may therefore be formed in the basin which originally housed the sand bed used for filtration. The invention therefore offers an interesting renovation solution for such conventional plants and allows improved production of drinking water at low cost.

The example of embodiment described here is not intended to reduce the extent of application of he invention. It may therefore be envisaged to make modifications thereto while still remaining within the limits of the invention. In particular it may be envisaged to equip the plant with a denitrification area upstream from reactor 7 or, as already mentioned, to do away with the pre-treatment means consisting of the flocculation-sedimentation unit and the clarifier. It may also be envisaged to use different reactive powders to those mentioned.

We claim:

1. Plant for the biological treatment of drinking water characterized in that it comprises at least one biological reactor (7) provided with means for injecting oxygenated gas (9), at least one separation membrane (11) for microfiltration or ultrafiltration immersed in said reactor (7), and addition means (10) within said reactor (7) for adding at least one pulverulent material in suspension serving as a support for a biomass, said pulverulent material possibly being made up of a reactive powder which also allows fixation of the substrate required by said biomass.

2. Plant according to claim 1, characterized in that said reactive powder is chosen from the group made up of powdered activated carbon, zeolites, ion exchange resins and clays.

3. Plant according to claim 1, characterized in that it also comprises at least one anoxic denitrification unit upstream of said biological reactor (7).

4. Plant according to claim 1, characterized in that said biological reactor (7) has sludge drainage means (14) in its upper and lower parts.

5. Plant according to claim 1, characterized in that it comprises pre-treatment means (3,4) provided upstream of said biological reactor, including clarification means (3).

6. Plant according to claim 1, characterized in that said membranes (11) are made up of hollow fibre membranes.

7. Plant according to claim 1, characterized in that the civil engineering works used for its set-up entails conversion of existing civil engineering works of a drinking water treatment plant with physical filtration through granular material, said biological reactor (7) consisting of a granular material filtration basin of said drinking water treatment plan.

8. Plant according to claim 1, characterized in that it comprises means of measurement (10a) for measuring concentrations of pollutants of said water, to which means of measurement is connected said addition means (10).

9. Process of biological water treatment to produce drinkable water, characterized in that it consists of passing the water through a plant in accordance with claim 1, of using said addition means of said plant to permit the addition to said reactor of at least one pulverulent material serving as a support for the biomass and/or the addition, at least intermittent, to said reactor of at least one reactive powder, said reactive powder being added in relation to the pollutants present in the raw water and/or to the temperature of the drinking water to be treated.

10. Process in accordance with claim 9 characterized in that it is set in operation when the temperature of the drinking water to be treated allows normal activity of said biomass permitting biological degradation of CODB and nitrogenous pollution in said water, and in that it consists of setting in operation said addition means to distribute at least one reactive powder in said reactor in relation to at least one parameter chosen from the group made up of pesticide content of the water, COD content of the water and heavy metal content of the water.

11. Process in accordance with claim 10 characterized in that it consists of setting in operation said means of addition of at least one pulverulent material to distribute powdered activated carbon in said reactor in order to adsorb COD and pesticides present in the drinking water to be treated.

12. Process in accordance with claim 10, characterized in that it consists of setting in operation said means of addition of at least one pulverulent material to distribute a zeolite or clay in said reactor in order to adsorb the heavy metals present in the drinking water to be treated.

13. Process in accordance with claim 10, characterized in that it comprises a stage consisting of maintaining within said reactor the reactive powders whose adsorbent properties have been exhausted, the latter subsequently forming a non-reactive pulverulent material which serves as a fixation support for the biomass.

14. Process in accordance with claim 9, characterized in that said means of addition of pulverulent material is set in operation when the temperature of the drinking water to be treated inhibits the biological activity of said biomass, in order to distribute within the reactor at least a first reactive powder intended to adsorb organic compounds and at least a second reactive powder intended to adsorb ammonia pollution.

15. Process in accordance with claim 12, characterized in that said first powder is powdered activated carbon.

16. Process in accordance with claim 12, characterized in that said second powder is chosen from the group made up of zeolites and clays.

17. Process in accordance with claim 12, characterized in that it consists of renewing the first and second powders when the adsorbing properties of the latter are exhausted.

* * * * *

UNITED STATES PATENT AND TRADEMARK OFFICE
CERTIFICATE OF CORRECTION

PATENT NO. : 5,932,099

DATED : August 3, 1999

INVENTOR(S) : Pierre Cote, Andresy; Jacques Sibony, Paris; Annie Tazi-Pain, Asnieres; Michel Faivre, Acheres, all of France It is certified that error appears in the above-identified patent and that said Letters Patent is hereby corrected as shown below:

Page 5, Line 28, Column 4, Line 9: Insert --may-- after the word "they"

Page 12, Tabl-1, Line 13, Col-1 8, Line 12: "Coliformis" should read --Coliforms--

Page 14, Line 16, Column 9, Line 28: "bring" should read --being--

Signed and Sealed this

Eighth Day of May, 2001

*Attest:*

NICHOLAS P. GODICI

*Attesting Officer*     Acting Director of the United States Patent and Trademark Office